Dec. 13, 1960     I. D. SILLMAN     2,964,586
APPARATUS FOR TRANSMISSION OF ELECTRICITY
Filed Nov. 9, 1956     5 Sheets-Sheet 2
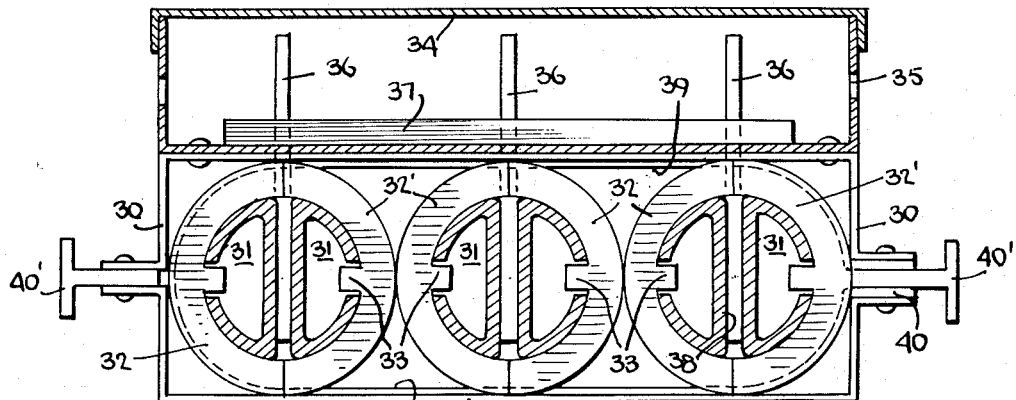
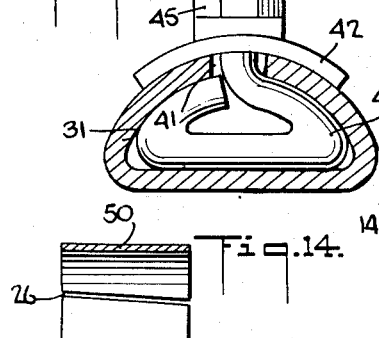
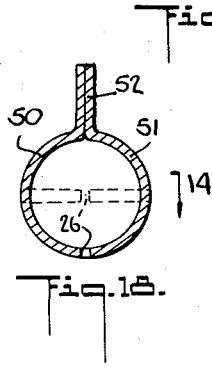
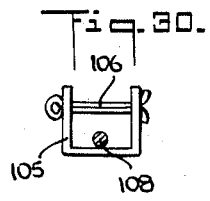
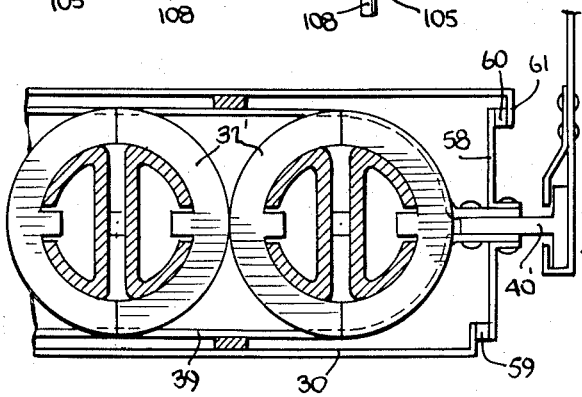
INVENTOR.
ISAAC D. SILLMAN
BY
ATTORNEY Dec. 13, 1960     I. D. SILLMAN     2,964,586
APPARATUS FOR TRANSMISSION OF ELECTRICITY
Filed Nov. 9, 1956     5 Sheets-Sheet 3
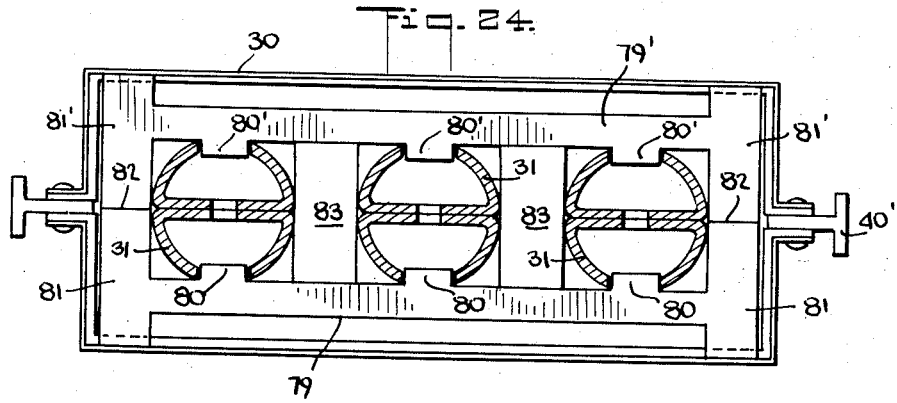
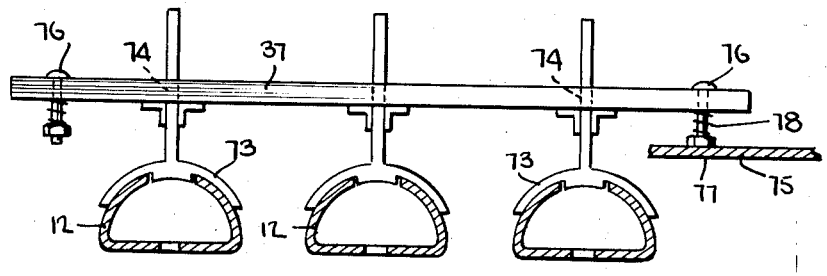
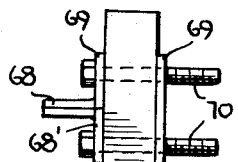
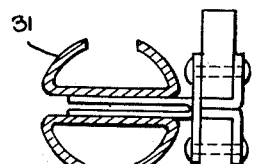
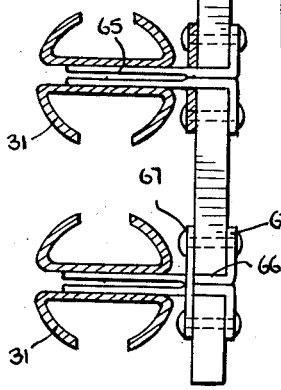
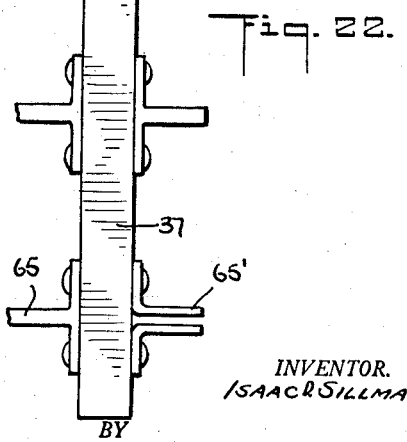
INVENTOR.
ISAAC D SILLMAN
BY
ATTORNEY Dec. 13, 1960     I. D. SILLMAN     2,964,586
APPARATUS FOR TRANSMISSION OF ELECTRICITY
Filed Nov. 9, 1956     5 Sheets-Sheet 4

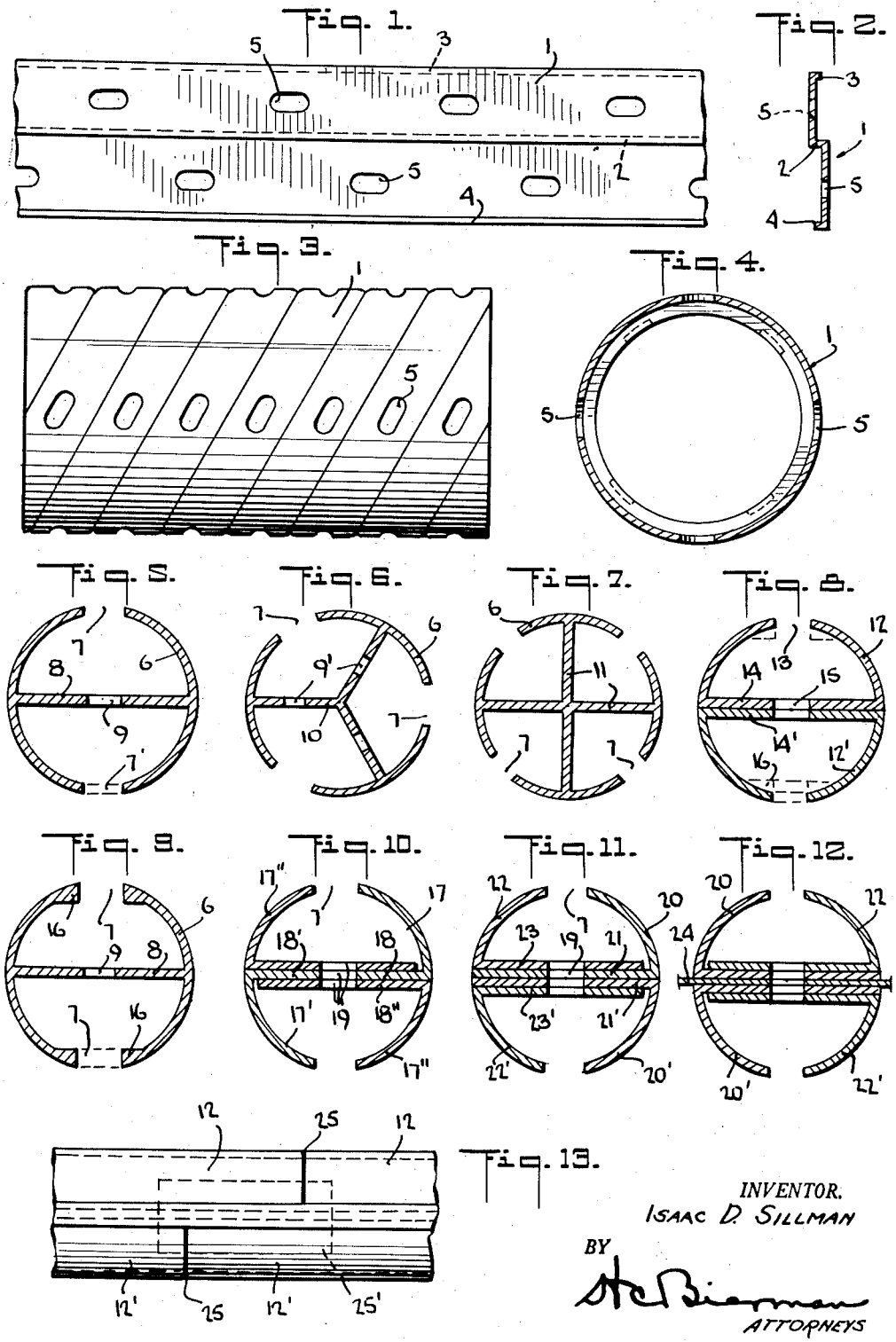

INVENTOR.
ISAAC D. SILLMAN
BY
ATTORNEY

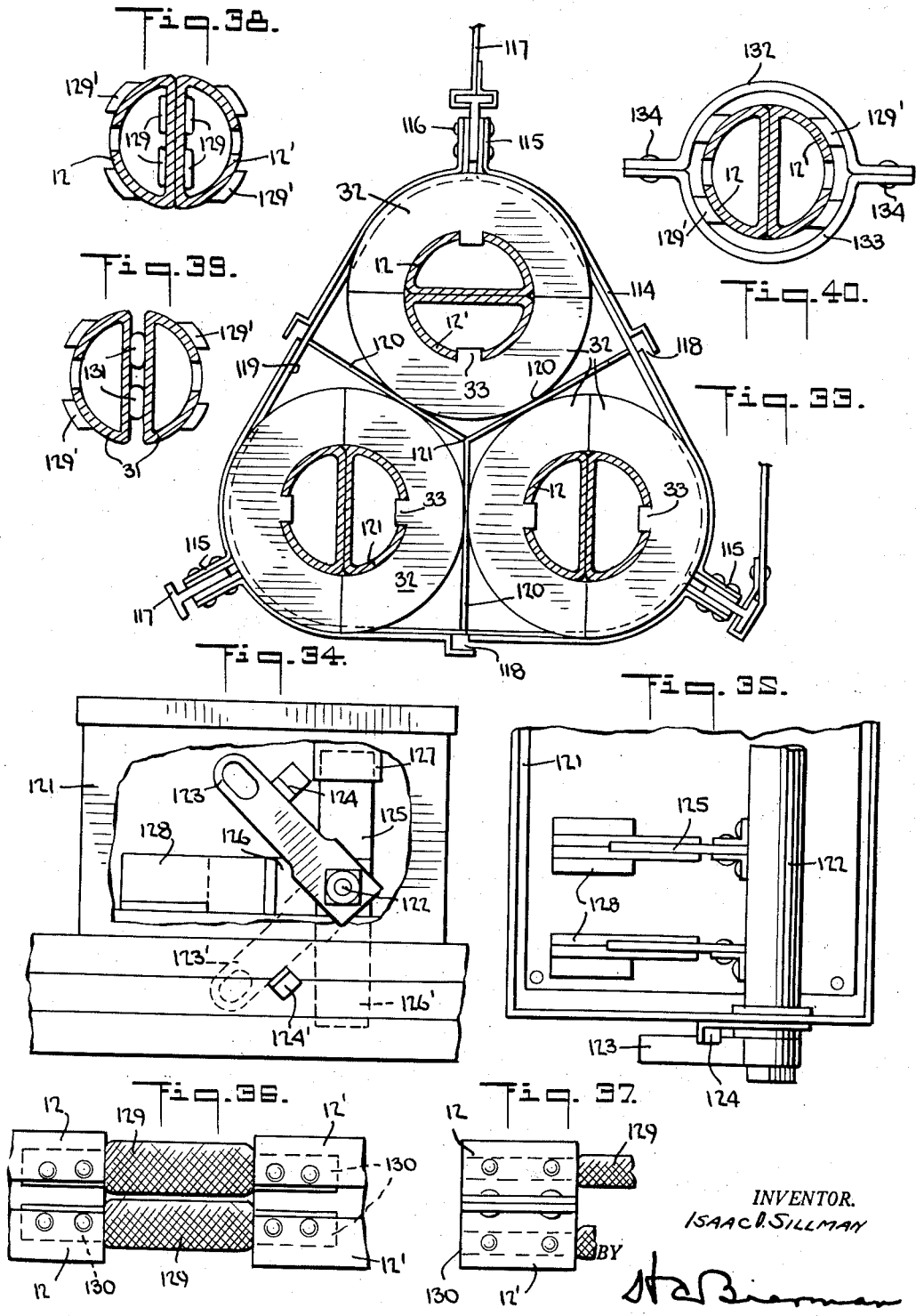

United States Patent Office 2,964,586
Patented Dec. 13, 1960

2,964,586

APPARATUS FOR TRANSMISSION OF ELECTRICITY

Isaac D. Sillman, 124 W. 93rd St., New York, N.Y.

Filed Nov. 9, 1956, Ser. No. 621,345

16 Claims. (Cl. 174—99)

The present invention is directed to multi-phase electrical transmission systems and more particularly to those wherein tubes are used for carrying the electricity. It is an improvement on and an extension of my Patent No. 2,732,420, dated January 24, 1956.

In the installation of such systems various conditions are met with in various structures which require various adaptions for convenience and economy. For instance various tube shapes and structures become desirable. This invention has for its objects to provide such improvements and, in the accompanying drawings constituting a part hereof, in which like reference characters indicate like parts, Fig. 1 is a plan view of a strip of metal to be made into the form of a tube;

Fig. 2 is a cross-sectional view thereof;

Fig. 3 is a side elevational view of a tube made from the strip shown in Figs. 1 and 2;

Fig. 4 is an end view of said tube;

Fig. 5 is a transverse cross-sectional view of a different type of tube which is extruded from a metal;

Figure 25:
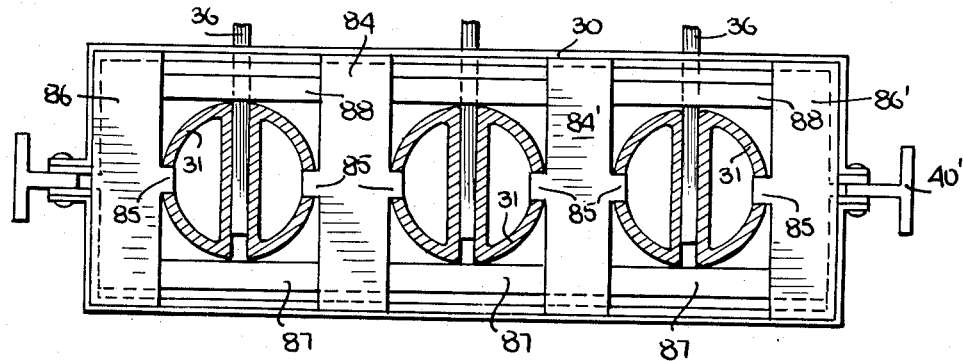
Figures 26, 27, 28, 29:
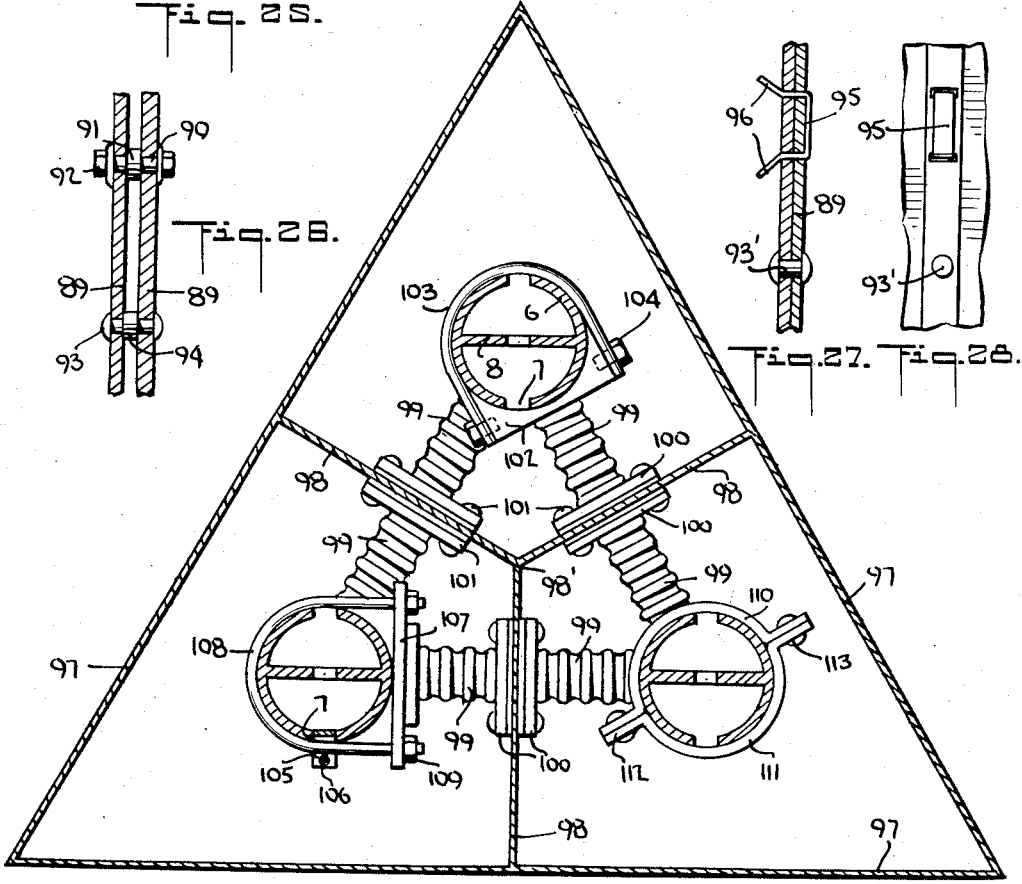
Figure 32:
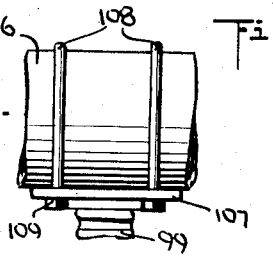

Figs. 6–12, inclusive, are views similar to Fig. 5 showing various embodiments of extruded or rolled tubes in one or more pieces;

Fig. 13 is a plan view of a joint whereby two tubes are connected with overlapping ends;

Fig. 14 is a detail of a joint shown in Fig. 18;

Fig. 15 is an end view of a side-by-side arrangement of tubes and illustrating take-off means associated therewith;

Figs. 16–19 inclusive, show several means for connecting a take-off to a single conductive tube or a set thereof;

Fig. 20 is a fragmentary view similar to that of Fig. 15 having added ventilating means provided therein;

Figs. 21 and 22 are end views showing connections for take-offs from the tubes in a side-by-side arrangement;

Fig. 23 illustrates a different form of take-off from such an arrangement;

Fig. 24 shows a side-by-side arrangement of tubes and illustrates one means for insulating and mounting said tubes;

Fig. 25 is a view similar to Fig. 24 in which a modified arrangement of tubes and modified form of insulation is provided;

Figs. 26–28 inclusive, are views showing several means for spacing apart and/or securing two pieces together to form a complete tube assembly;

Figs. 29–32 inclusive, are respectively an end cross-sectional view of a delta arrangement of tubes and details thereof.

Fig. 33 is a view similar to Fig. 29 illustrating a different form of both tube and insulation;

Fig. 34 is a side elevational view of a switching arrangement for a side-by-side series of tubes;

Fig. 35 is a top plan view of the embodiment of Fig. 34;

Fig. 36 is a side elevational view of an expansion joint for longitudinal alined tubes;

Fig. 37 is a fragmentary top plan view of the expansion joint of Fig. 36, and

Figs. 38, 39 and 40 are end views showing several methods of assembly and attachment of expansion joints or an intermediate protective device.

Referring to Figs. 1–4, copper or aluminum strip 1 has an offset 2 centrally thereof and oppositely directed short flanges 3 and 4. A series of spaced openings 5 are formed in two longitudinal rows. The strip 1 is rolled spirally as shown in Fig. 3 with flanges 3 and 4 of adjacent edges interlocking. Thereby a conductive tube is obtained, which is flexible and which has series of openings in longitudinal alinement, for ventilation and cooling. For greater current carrying capacity, a similar tube of slightly smaller diameter may be inserted and electrically connected to the first tube.

In Fig. 5 the conductive tube is an extruded section consisting of a tube 6 having a pair of longitudinal, oppositely placed slots 7. An integral cross member 8 between slots 7 strengthens the tube and adds metal to increase the conductivity. Opening 9 is formed in a central area of member 8, and a number of such openings may be spaced along said member. Fig. 6 shows a similar cross member 10 having three arms with openings 9'; tube 6 has three slots 7. Fig. 7 is also similar and it has member 11 in the form of a cross and has four slots 7.

The embodiment of Fig. 8 shows the tube made of two extruded or rolled members which are identical. Semi-circular tube 12 has longitudinal slot 13 and an integral base 14. A similar tube 12' has base 14', the two bases being in contact. Openings 15 in the bases provides means for cross ventilation or for passing a bolt or rivet therethrough to hold the tubes together. To increase the stiffness of the resulting duct at the slots and to increase the conductivity thereof, integral longitudinal bosses 16 may be formed during the extrusion. In Fig. 9 such bosses 16 are formed, and the bottom slot 7' may be omitted or it may be closed by suitable means.

Fig. 10 illustrates a duct made up of three parts. Arcuate members 17 and 17' are connected by base 18 all formed by extrusion or otherwise. Two members are provided, each consisting of an arcuate portion 17" and a base 18". When all three parts are assembled, openings 19 therein are in alinement. In Fig. 11, four pieces are used; arcuate portion 20 has a base 21; arcuate portion 20' has a base 21'; arcuate portion 22 has a base 23; arcuate portion 22' has a base 23', and all of the bases are assembled as shown. Fig. 12 is similar to Fig. 11, having a conducting bar 24 centrally located and adapted for use as a take-off, or if it is insulated it may be used as a neutral bar.

Ducts of the character shown may be assembled end to end in staggered relation, as shown in Fig. 13. For instance, a tube 12 is assembled with tubes 12' with the ends thereof offset or staggered. Such sets 12—12' are assembled end to end in overlapping relation to form joints 25. To increase conductivity and to strengthen the joint there is secured within the tubes a plate 25'.

An assembly of three tubes constituting a three-phase system is shown in Fig. 15. Casing 30 holds three side-by-side tubes, each of which is made up of two semi-circular members 31. Each tube is surrounded by insulating members at spaced intervals, the insulation consisting of a pair of semi-circular members 32—32' and having tongues 33 projecting into the slots, and stiffening the tubes. In order to make contact with the tubes there is provided a box 34 having one or more openings 35 for inserting cables. Contact blades 36 held on insulating board 37 are adapted to be inserted into the spaces 38 between the pairs of semi-tubes 31. A band 39 passing around insulators 32—32' has its ends fixed at 40 to hold the assembly from accidental displacement and its embraces support 40'. Between each set of bands 39 or 40 and each following set an air space is obtained between casing 30 and support 40'.

Fig. 16 illustrates a take-off connection to a semi-tube 31 having slot 41. Contact shoe 42 fits over slot 41. A bolt 43 has a head 44 fitting into tube 31 and a nut 45 is tightened against shoe 42. Another structure of take-off is shown in Fig. 17, wherein clamp members 46 and 47 surround tubes 12 and have in-turned flanges 47 contacting the sides of slot 13. Ends 48 embrace contact bar 49, the lower end of which is in contact with base 14, and the bar is secured to the clamp by rivets 48'.

Another connector is shown in Figs. 14 and 18; it consists of two parts 50 and 51 fitting into the inside of a tube and has its ends 52 projecting out through the slot in the tube. The junction of the halves of the connector is along a diagonal line 27 to make a firm contact.

Still another form of connector is illustrated in Fig. 19. Shoe 42 fits over slot 41 and bolt 53 having head 54 passes through the shoe, being clamped in position by nut 55. Instead of head 54 the bolt may be extended as shown at 56 and it may terminate in shoe 57 or have shoe 57 secured thereto.

The casing of Fig. 15 may be modified as shown in Fig. 20 to provide circulation of air. Side 58 of casing 30 is spaced by block 59, or an external block or blocks 60 may be interposed between side 58 and overhang 61 of the casing.

The take-off means of Fig. 15 may be modified as shown in Fig. 21 wherein there are attached to insulating board 37, split connector blades 65, the stems 66 of which pass through openings in board 37 and are fixed by plates 67 and rivets 67' to the board. In Fig. 22 is shown a pair of connector blades 65 and 65' secured to board 37. Also, blade 68 having a base 68' is secured to board 37 by plate 69 into which are threaded screws 70.

A shoe type of take-off such as shown in Fig. 19, for example, may be mounted on the insulating board 37. In Fig. 23, shoe 73 is secured to board 37 at 74 by suitable means. A plurality of such shoes may be so mounted in parallel arrangement. Into support 75 is threaded the end 77 of bolt 76 which passes through board 37. A coil spring 78 on bolt 76 is interposed between board 76 and support 75.

In Fig. 24 is illustrated a modified form of insulation for a set of tubes 31, which have longitudinal slots along opposite edges. An elongated insulating piece 79 having tongues 80 extending into the slots of the three tubes on one side is held within casing 30. A duplicate insulating piece 79' has tongues 81' extending into the slots on the opposite side. Both pieces 79 and 79' are spaced as required and have end extensions 81 and 81' meeting at 82 to support and insulate at required intervals the set of tubes. Insulating spacers 83 separate the adjacent tubes.

A further modified form of insulation based on the embodiment of Fig. 15 is shown in Fig. 25. Insulating pieces 84 and 84' are inserted between adjacent tubes 31; the pieces have oppositely extending tongues 85 and 85' respectively, the tongues entering the adjacent slots of two of the tubes. End insulating pieces 86 and 86' have tongues 85 and 85' extending into the slots of the end tubes which face outwardly. Filler insulating pieces 87 and 88 contact both the tubes and the other insulating pieces and maintain proper alinement and position of the tubes.

Figs. 26, 27 and 28 illustrate various means for uniting or spacing the bases of two half tubes to form a complete tube such as is shown in Figs. 8, 15 and 24. In Fig. 26 bases 89, similar to bases 14 of Fig. 8 have openings through which extend bolts 90 having central enlargements 91 and nuts 92 to clamp the bases together. In the alternative rivets 93 having central enlargements 94 may be used. As seen in Figs. 27 and 28, the bases may be in contact and rivets 93' hold them together. These bases may be provided with slotted openings through which U-shaped straps 95 are passed, the ends 96 of the straps being distorted to press bases 89 together or to lock them against accidental displacement.

Figs. 29–32 are directed to a delta arrangement of the conducting tubes. The tubes, in this case of the type shown in Fig. 5, are surrounded by a protective casing 97, triangular in cross-section. Extending inwardly from about the central portion of each of the sides of casing 97 are septa 98 meeting at 98' forming three separate chambers each of which carries a tube 6. Mounted on both sides of each septum 98 are porcelain or other insulators 99, which are clamped between plates 100 by rivets or bolts 101.

Various means for securing the tubes to insulators 99 are provided. A block 102 is attached to the end of insulator 99 and strap 103 surrounding tube 6 has its ends contacting the sides of block 102 and secured thereto by screws 104.

Plate 107 is attached to insulator 99 and has openings at the corners thereof. A U-bolt or strap 108 surrounding tube 6 has its ends passing through said openings, with nuts 109 threaded on said ends. Another securing means for said tubes is shown in the lower right hand corner of Fig. 29. A pair of bands or straps 110 and 111, semicircular in shape, have meeting extensions 112 which are held together in gripping position by rivets or bolts 113 or other suitable fastener. One of said bands 110—111 is suitably mounted on the free end of insulator 99.

In order to give greater rigidity to tubes 6 spacers attached to a strap or the like may be inserted at intervals in slots 7 by stiffening members or spacers, as shown more particularly in Figs. 30 and 31, said spacers consist of U-shaped members 105 which have their bases inserted into slot 7 and embracing a leg of U-bolt 108; a cotter pin 106 or other device joins the legs of member or stiffener 105 and prevents accidental displacement thereof.

Another delta arrangement is shown in Fig. 33 wherein each of tubes 12—12' is held between the halves of semi-circular insulators 32. Three identical straps or bands 119 in grooves of the insulators hold them together. Septa 120 meeting at 121 and secured to the casing form chambers for the tubes, the insulators of which contact the septa. A casing 114, in three identical sections surrounds the insulators, the flanges 115 of adjacent sections being secured by rivets 116 to support member 117. Ventilating openings 118 may be provided at intervals.

Figs. 34 and 35 illustrate switching mechanism for connecting and disconnecting take-offs from a side-by-side alinement of the conductors. In casing 121 is mounted shaft 122 having handle 123 on the outside thereof. Stops 124 and 124' limit the movement of the handle. A knife blade having the elements 125 and 126 at right angles to each other are mounted on shaft 122 and are adapted to make electrical contact simultaneously with contacts 126' and 128 of the power lines and the take-off line.

In order to avoid strains on said tubes by expansions and contractions due to changes in temperature, expansion joints are provided as shown in Figs. 36 to 40. A plurality of flexible and expandable wire woven cables 129 are interposed between the spaced ends of longitudinally adjacent tubes 12—12', for example. Ends 130 of said cables are secured, as by riveting, to the ends of tubes 12—12'. In Fig. 38 the cables 129 are attached to the bases of the tubes; in place thereof cables 129' may be attached on the outside of tubes 12—12'. In Fig. 39 the space between the bases of semi-circular tubes 31 and bridging adjacent tubes has one or more current interrupting protective devices 131 in place of an expansion joint; or such joints 129' may be provided. In Fig. 40, the expansion joints 129' are on the outside of the tube and are clamped into position by straps 132 and 133 riveted or bolted together at 134.

Member 40' of Figs. 15, 20, 24 and 25 and member 117 of Fig. 34 serve a dual purpose of attachment to the insulator straps which, in turn, support the outer casing. This creates a space between the outer casing and 40' and 117. In addition, space 118 is shown in Fig. 34. The shape of 40', 117 and 118 is such that no foreign body can be inserted through these openings to prevent contact with the conductive tubes. The casing may be made of expanded or perforated metal.

To prevent accidental shorting of the tubes by foreign bodies, the tubes may be sprayed with insulating lacquer, latex or the like, or wrapped with suitably impregnated tape of natural or synthetic fibers, such as cotton or nylon, which may be done before or after the assembly of the conducting elements to form the structure. All the tubes, being circular in section, will be so treated only on the outer circumference. The inner surfaces will retain their radiation and conduction properties. These tend to economies in labor of assembling.

Any of the conductor shapes shown in Figs. 5–12, 15, 20, 24, and 34 may be used singly or in combination to provide any multiphase or multi-conductor assembly, and together or separately for any types of take-off, whether in side-by-side alinement or in delta formation.

I claim:

1. An electrically conductive tube consisting of at least two members each having a flat base along one side thereof, said bases being in superposed relation, said tube having a plurality of longitudinal slots along substantially the entire length of said tube, and an internal cross member integral with said tube, alined openings in said bases, fasteners passing through said openings, said fasteners having central enlargements to space said bases apart.

2. An electrically conductive tube consisting of at least two members each having a flat base along one side thereof, said bases being in superposed relation, said tube having a plurality of longitudinal slots along substantially the entire length of said tube, and an internal cross member integral with said tube, said bases each having a pair of alined openings, and a U-shaped fastener passing therethrough.

3. An assembly of a plurality of conductive tubes, said tubes being held in delta alinement, having a casing surrounding said tubes, septa extending inwardly from the walls of said casing and forming three chambers each containing a conducting tube, said tubes being free of support from said casing, insulators mounted on said septa, each of said tubes being secured to at least one of said insulators.

4. An assembly of a plurality of conductive tubes, said tubes being held in delta alinement, having a casing surrounding said tubes, septa extending inwardly from the walls of said casing and forming three chambers each containing a conducting tube, said tubes being free of support from said casing, insulators mounted on said septa, each of said tubes being secured to insulators extending from two of said septa.

5. An assembly of a plurality of conductive tubes, said tubes being held in delta alinement, having a casing surrounding said tubes, septa extending inwardly from the walls of said casing and forming three chambers each containing a conducting tube, said tubes being free of support from said casing, insulators mounted on said septa, each of said tubes being secured to at least one of said insulators, two of said insulators being mounted on opposite sides of a single septum.

6. An assembly of a plurality of conductive tubes, said tubes being held in delta alinement, having a casing surrounding said tubes, septa extending inwardly from the walls of said casing and forming three chambers each containing a conducting tube, insulators mounted on said septa, each of said tubes being secured to at least one of said insulators by straps passing around said tubes and fastened to said insulators.

7. An electrically conductive tube having a longitudinal slot therein, a strap embracing said tube and secured to a support, a U-shaped stiffener around said tube and embracing said tube, the ends of said stiffener being secured to said support.

8. An assembly of a plurality of conductive tubes in side-by-side alinement, each of said tubes comprising a pair of tubular members having flat bases adjacent to each other, each of said members having a longitudinal slot, means for holding said members together, said slots being spaced from said bases, insulation pieces surrounding said tubes, tongues on said pieces extending into said slots, and electrically conductive take-offs in contact with and between said bases.

9. An assembly of a plurality of conductive tubes in side-by-side alinement, each of said tubes comprising a pair of tubular members having flat bases adjacent to each other, each of said members having a longitudinal slot, means for holding said members together, said slots being spaced from said bases, insulation pieces surrounding said tubes, said pieces being flat and having transverse end extensions, tongues on said pieces extending into said slots, and electrically conductive take-offs in contact with and between said bases.

10. An assembly of a plurality of conductive tubes in side-by-side alinement, each of said tubes comprising a pair of tubular members having flat bases adjacent to each other, each of said members having a longitudinal slot, means for holding said members together, said slots being spaced from said bases, insulation pieces surrounding said tubes, at least one of said pieces being transverse to said alinement and having oppositely extending tongues, tongues on said pieces extending into said slots, and electrically conductive take-offs in contact with and between said bases.

11. An assembly of a plurality of conductive tubes in side-by-side alinement, each of said tubes comprising a pair of tubular members having flat bases adjacent to each other, each of said members having a longitudinal slot, means for holding said members together, said slots being spaced from said bases, insulation pieces surrounding said tubes, filler pieces between said insulating pieces, tongues on said pieces extending into said slots, and electrically conductive take-offs in contact with and between said bases.

12. An electrically conductive tube comprising a pair of semi-circular members having flat bases adjacent to each other, each of said members having a longitudinal slot, means for holding said members with their bases adjacent each other and in parallel relation, said slots being spaced from said bases, and an electrically conductive take-off in contact with and between said bases.

13. An electrically conductive tube comprising a pair of semi-circular members having flat bases adjacent to each other, each of said members having a longitudinal slot, means for holding said members with their bases adjacent each other and in parallel relation, said slots being spaced from said bases, and an electrically conductive take-off in contact with and between said bases, said take-off being expansible and flexible.

14. An electrically conductive tube comprising a pair of semi-circular members having flat bases adjacent to each other, each of said members having a longitudinal slot, means for holding said members with their bases adjacent to each other and in parallel relation, said slots being spaced from said bases, and a conductive spacer in contact with and between said bases.

15. An electrically conductive tube of a metal adapted to carry substantial currents without short-circuiting comprising a single member of substantially circular cross-section and having a plurality of longitudinal slots along substantially the entire length of said tube, and an internal cross-member integral with said tube, said cross member being merged with said tube between said slots.

16. An electrically conductive tube of a metal adapted to carry substantial currents without short-circuiting comprising two members each having a flat base along one side thereof and being semi-circular, said bases being adjacent to each other, means for holding said members together, said tube of circular cross-section and having a plurality of longitudinal slots along substantially the entire length of said tube opposite to said bases, and an internal cross member integral with said tube, said cross member being merged with said tube between said slots.

References Cited in the file of this patent

UNITED STATES PATENTS

| | | |
|---|---|---|
| 433,921 | Wiley et al. | Aug. 5, 1890 |
| 1,399,493 | Krantz | Dec. 6, 1921 |
| 1,410,780 | Tisler | Mar. 28, 1922 |
| 1,577,162 | Bennington | Mar. 16, 1926 |
| 1,629,158 | Griswold | May 17, 1927 |
| 2,053,561 | Jennison | Sept. 8, 1936 |
| 2,216,870 | Adam | Oct. 8, 1940 |
| 2,263,211 | Harvey et al. | Nov. 18, 1941 |
| 2,264,075 | Frank | Nov. 25, 1941 |
| 2,320,093 | Moore | May 25, 1943 |
| 2,356,708 | Sileck | Aug. 22, 1944 |
| 2,452,823 | Wright | Nov. 2, 1948 |
| 2,482,310 | Adam | Sept. 20, 1949 |
| 2,732,420 | Sillman | Jan. 24, 1956 |
| 2,733,289 | Warren et al. | Jan. 31, 1956 |
| 2,767,241 | Zuch | Oct. 16, 1956 |
| 2,904,621 | Grier | Sept. 15, 1959 |

FOREIGN PATENTS

| | | |
|---|---|---|
| 162,224 | Germany | Aug. 26, 1905 |
| 881,083 | Germany | June 25, 1953 |